United States Patent Office 2,907,070
Patented Oct. 6, 1959

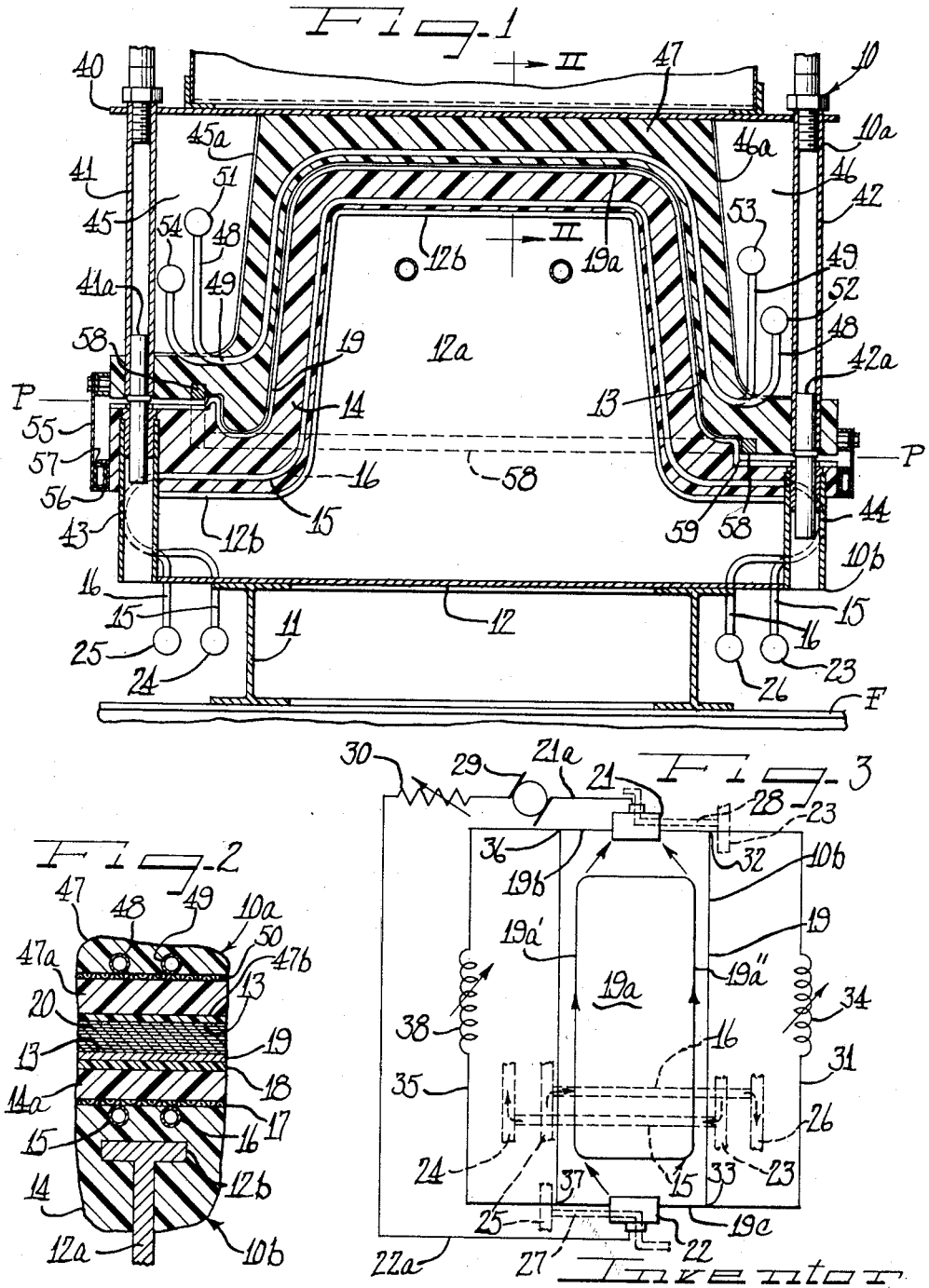

2,907,070

TEMPERATURE CONTROL APPARATUS FOR A MOLD

Carroll H. Van Hartesveldt, Birmingham, Mich.

Application March 25, 1955, Serial No. 496,810

3 Claims. (Cl. 18—38)

The instant invention relates to temperature control in molding apparatus, and more particularly, to an improved molding apparatus for the fabrication of glass fiber-polyester resin parts or the like, wherein the temperature control throughout the entire apparatus is improved.

In recent times, there has developed a very great demand for the glass fiber-polyester resin laminates, which have unusually superior structural characteristics such as high strength, impact resistance, resilience and relatively light weight. Although the instant invention can be employed in connection with the molding of other synthetic resin products, the instant invention offers unique advantages in connection with the preparation of such laminates and the description herein will deal primarily with molding procedures involving glass fiber-polyester resin laminates.

Heretofore, the most effective production methods available for the manufacture of these glass fiber-polyester resin laminates involve the use of steam or water-heated matched metal dies operated in a hydraulic press. For the larger laminates, these dies are extremely expensive and are often quite difficult to operate. Plastic or synthetic resin dies have been considered in connection with the molding of small articles, but such dies have not been adapted to the molding of larger articles for a number of reasons, including temperature control. Such synthetic resin materials as the phenolic or epoxy resins which might possibly be used in the dies are heat and electrical insulators of a type which greatly complicates the temperature control problem in large size dies. The poor heat conductivity of such material would ordinarily very materially increase the molding cycle in view of the additional time required to heat the entire body of the resin in order to impart enough heat to the cavity. Another problem of particular importance is that the phenolic or epoxy resins have only limited resistance to deterioration caused by heat. This type of material will stand up under a number of heating and cooling cycles, but the rate of deterioration or degradation caused by heat is materially accelerated if the entire body of the plastic is heated to the full temperature required for driving heat through to the molding composition to be cured in each molding cycle. Also, deterioration is accelerated if it becomes necessary to heat the resin body to the maximum temperature required for molding.

The instant invention provides an apparatus for utilizing such advantageous features as strength, inexpensiveness and casting accuracy available in such phenolic and epoxy resins for mold fabrication. The instant invention provides these advantages by a unique heating and/or cooling structure and a method of accomplishing heating and cooling in appropriate portions of the mold. In the instant invention, the mold body is formed of a rigid electrical insulator such as the resins above mentioned, and preferably of the epoxy resin filled with metal particles to impart semi-thermal conductivity thereto, which may be cast with the die cavity formed therein in an extremely accurate manner. A relatively thin heat and electrical conductor lining is mounted within the cavity, with the exposed face of the lining defining the die surface; and this lining is preferably made of fairly resistant (electrically) metal, most preferably stainless steel. Ordinary electrical contacts are mounted on opposite sides of the lining arranged to conduct an electric current through the lining so as to heat the same. After the mold is closed with the polyester laminate therein (or any other thermosetting resin composition) a voltage differential is created across the electrical contacts to the extent desired so as to obtain heating of the lining to the extent desired. The lining being in direct contact with the molding composition heats the composition and effects the thermosetting or curing thereof.

In order to prevent the thermal deterioration of the synthetic resin body supporting the lining, cooling coils are mounted or embedded in the body of the resin so as to be spaced an appreciable distance from the lining (although located generally adjacent to the lining), so that the body of the resin is maintained at a lower temperature than that of the lining and thermal deterioration thereof is minimized. It is important to space the cooling coils from the lining, however, because the cooling coils immediately adjacent the lining will serve to cool the lining to such a substantial extent that much more electric current must be passed through the lining than is practical. By spacing the coils from the lining, it is possible to cool the bulk of the resin body and maintain the same at a sufficiently low temperature to prevent thermal deterioration; and it may be advantageous to provide a highly heat-resistant film of resin (which does not have the strength properties of epoxy or phenolic resin) in between the lining and the resin mold body, so that the resin mold body immediately adjacent the lining will not be subjected to such high temperatures. Also, it has been found important to carry out cooling at the point of contact between the electrical lead and the lining (because of the relatively great differences of conductivity between the two metals at this point) and to employ by-pass means across spaced portions of the lining in order to obtain uniform current flow across the entire lining. In each case, the concept involved is not that of simultaneously maintaining uniform temperature at all points on the exposed surface of the lining and also maintaining adequately low temperatures in the resin mold body to prevent thermal deterioration, but also maintaining adequately low and uniform temperatures in the resin mold body to gain dimensional control and constancy.

It is, therefore, an important object of the instant invention to provide an improved molding apparatus for the preparation of thermoset resin molded parts.

It is another object of the instant invention to provide a mold of the character described, comprising a rigid electrical insulator body having a die cavity therein, a relatively thin heat and electrical conductor lining fitting within the cavity and supported by the mold body, a cooling coil embedded in said body and spaced from said lining by a heat and electrical insulator, and electric contacts connected to said lining and arranged to conduct a current therethrough.

Other objects, features and advantages of the instant invention will become apparent to those skilled in the art from the following detailed disclosure thereof and the drawings attached hereto and made a part hereof.

On the drawings:

Figure 1 is a sectional elevational view of a mold embodying the instant invention;

Figure 2 is an enlarged detail sectional view taken substantially along the line II—II of Figure 1; and Figure 3 is essentially a diagrammatic top plan view of the mold element used in Figure 1, with the electrical apparatus shown diagrammatically.

As shown on the drawings:

In Figures 1 and 2, a mold assembly designated generally by the reference numeral 10, comprises an upper movable molding block or body 10a and a lower stationary molding block or body 10b. The lower body 10b is a rigid electrical insulator which may be made of any of a number of suitable structural lighter weight material such as wood or the like, which are recognized as being materials having low coefficient of electrical conductivity so that they are, for all practical purposes "insulators." As has been pointed out, if the lower block 10b were a good heat conductor, without a heat insulator portion between the source of heat and the main body of the lower block 10b, the advantages of the instant invention would not be achieved and there would be the disadvantage that the entire block 10b would have to be heated during each molding cycle.

Referring now to the lower molding block 10b, it will be noted that the block 10b is suitably mounted on a base member 11 secured to a foundation or floor F for substantially permanent assembly. The molding block 10b comprises as a framework a plurality of longitudinally spaced reinforcing members (only one of which, 12, is shown in Figure 1); and such reinforcing members 12 are made of metal or a suitable strengthening material and they extend from opposite sides of the mold member 10b inwardly and upwardly in a portion 12a which conforms generally with the dish-shaped die cavity 13 between the mold members 10a and 10b. The reinforcing members 12 are provided with a top flange 12b which follows along the top edge of the molding member 12 generally conforming with the contour of the cavity 13 (the flange is best shown in Figure 2); and it will be noted that the flange is embedded in a synthetic resin body 14 which forms the matrix for the lower molding block 10b. The lower block 10b is thus composed essentially of a resin matrix (of phenolic or epoxy resin) which is reinforced by longitudinally spaced reinforcing elements 12. In the resin matrix 14 just over the top of the reinforcing flanges 12b, but spaced therefrom, there are a plurality of copper tubes which define heating or cooling coils, as the case may be. In the instant structure, the copper tubes 15 and 16 (Figure 2) define cooling water conduits, which are spaced apart one to three inches (and preferably two inches) in the longitudinal direction indicated in Figure 2 and which serve to effectively control the temperature of the resinous material in the molding block 10b, as will be described in detail hereinafter. Referring to Figure 2 again, it will be noted that the coils 15 and 16 are welded or otherwise secured to a copper or similar highly conductive metal screen 17 which is on the cavity side of the coils 15 and 16 and which, like the coils 15 and 16 is spaced from but contoured to conform with the contour of the supporting flange 12b (and the cavity 13). Above the copper screen 17, there is positioned a layer of synthetic resin (preferably epoxy resin) designated generally as 14a, which may be merely a continuation of the epoxy resin matrix 14, or it is preferably filled with particles of heat conductor material, such as aluminum, which serve to increase the heat conductivity of this particular layer 14a of the resin molding block 10b. Above the layer 14a there is preferably positioned a very thin layer 18 of highly heat-resistant heat and electrical insulator material, such as silicone resin or heat-resistant elastomeric or rubber-like material, which relies on the resin matrix 14 (and 14a) for strength. Immediately above the silicone resin layer 18 there is mounted the stainless steel sheet which provides the metal lining 19 for the cavity 13. As shown in Figure 2, the cavity 13 is filled with a polyester resin-glass fiber laminate 20, during the molding cycle.

It should be mentioned that the particular structural arrangement of the lower molding block 10b, described in detail in connection with Figure 2, has been found to be of very great importance. It is necessary to obtain (rather rapidly) in the skin or lining 19 a relatively high temperature which is obtained by the use of the thin lining 19 (of predetermined fixed thickness) made of a relatively resistant metal which effects appreciable heat generation when a current is passed therethrough. As a practical matter, the skin temperature at certain moments in the cycle should be at least about 200° F., and preferably 225 to 280° F. If a cooling coil is positioned closely adjacent to (or not insulated from) the stainless steel skin 19 for the purpose of attempting to maintain suitable temperatures in the remainder of the resin body, it is necessary to obtain a relatively high cooling rate and the net result is that the skin temperatures desired cannot be reached in the stainless steel layer 19. Instead, a very inefficient arrangement is obtained whereby very substantial heat losses through the cooling coils make the procedure impractical and the relative reduction in the skin temperature obtainable makes the molding cycle impractical. It has been found of great importance to actually space the cooling coils from the liner 19 so as to obtain a distinct and appreciable temperature drop across the resinous layer (14a and 18 interposed between the lining 19 and the coils 15 and 16). Also, it has been found important to employ a conductive sheet, such as the screen 17, in contact with the coils 15 and 16 so as to substantially equalize the temperature in the resin matrix along a surface in which the coils 15 and 16 lie, as here defined by the screen 17. The presence of the screen 17 greatly improves temperature control at the location of the coils 15 and 16, permitting a much lower temperature differential between the coils 15 and 16 and the resin 14 immediately adjacent thereto.

It has also been found important to use a thermally resistant layer 18 of material which can withstand relatively high temperatures, even though it is not necessarily structurally strong at such high temperatures. The material of the layer 18 is preferably a silicone resin or silicone rubber or other heat-resistant rubber material, all of which materials are generally classified as heat-resistant elastomeric materials. The elastomeric material also affords an advantage in that it may receive and dispose of conflicting forces caused by the difference in coefficient of thermal expansion between the stainless steel skin 19 and the resin body 14. In actual practice, the layer 18 of elastomeric material can be very thin (⅛ to ⅜ inch, and preferably ¼ inch) so that the resin body 14 still provides the principal support for the stainless steel skin 19, but also so that a temperature drop across the elastomeric layer 18 of from at least 50 to about 150° F., and preferably about 100° F. across the elastomeric layer. The elastomeric layer is, of course, an electric insulator so as to not afford any current by-pass at this point for the current flowing through the stainless steel lining 19. Also, the elastomeric layer 18 is a high heat insulator so as to effect a maximum temperature drop thereacross. The heat inhulative or conductive properties of materials are generally calculated on the basis of the heat transfer coefficient "$k$" which is defined at B.t.u./(hr.) (sq. ft.) (°F. per ft.); and this is thus the ability of a given material of 1 square foot cross-sectional area and 1 foot depth to transmit or conduct a given number of B.t.u.'s of heat per hour with a given temperature differential in degrees Fahrenheit across the material. In the case of the usual commercial conductors of copper (or aluminum or silver) $k$ has a value of at least about 100 and may be as high as about 240. In the case of metals used for giving off heat when a current is passed therethrough, $k$ may range from just less than 100 to as low as about 5, and in the case of stainless steel or comparable metals preferred for use in the instant lining 19 $k$ is about 10–20. In contrast, the elastomeric material of the heat resistant lining 18 used in the practice of the instant invention has a $k$ value of about 0.1 to about 0.2, and this $k$ value should be within the range of 0.05 to 0.5 for effective and most advantageous operation.

The relatively thick layer 14a which functions as a spacer between the coils 15 and 16 and the lining 19 is formed primarily of epoxy resin, which has a $k$ value of substantially the same as the silicone resin. For this reason, the epoxy resin is preferably filled with aluminum particles (or similar highly heat-conductive particles) so as to increase the $k$ value of the epoxy resin to at least about 0.5 up to about 2. In actual practice, aluminum filled epoxy resin having a $k$ value of about 1–1.2 has been found to be highly satisfactory. Using the relatively high temperature drop obtained in the case of the heat-resistant elastomeric layer 18 hereinbefore described, the outer surface of the aluminum filled epoxy resin layer 14a should be less than about 160° F. (although temperatures up to about 180° F. can be used) and the temperature drop effected across this relatively thick layer 14a (i.e., 1–3 inches, and preferably about 1½ to 1¾ inches) should be at least about 25° F. up to 75° F. and is preferably about 50° F. In the preferred embodiment of the instant invention, the temperature in the region of the copper coils 15 and 16 (or at the screen 17) is less than 120° F. and is within the range of about 100–120° F. which is substantially above the temperature of ordinarily available cooling water.

In general, other synthetic thermosetting resins having the generally recognized properties of heat-resistance will function in a manner comparable to the epoxy resin (with or without the aluminum particle filler), although the epoxy resin has been found to be preferred.

The general arrangement of the cooling coils 15 and 16 has also been found to be of importance, since the relatively low heat-conductivity of even the aluminum filled epoxy resin layer 14a tends to complicate the problem of maintaining uniform heat throughout the body of the molding member 10b. The presence of the highly conductive sheet or screen 17 is helpful, but it has also been found to be of importance to employ countercurrent or oppositely directed flow thus in the copper tube 16 the flow of cooling water goes in one direction and in the immediately adjacent copper tube 17 the flow of cooling water goes in the opposite direction. This is shown diagrammatically in Figure 3.

Referring briefly to Figure 3, it will be noted that the top plan view of the bottom molding block reveals the stainless steel lining 19 having an upwardly extending bulging portion 19a conforming with the general contour of a bathtub and having electrical leads 21 and 22 at opposite ends of the lining 19. The two cooling coils 15 and 16 are shown in essentially a diagrammatic view (but in dotted lines since they are concealed by the skin 19) and it will be appreciated that the entire molding block 10b has a much greater number of longitudinally spaced laterally extending copper tubes than the two tubes 15 and 16 here indicated. Cooling water flows into the copper tube 15 from a high pressure water header 23 passing through the tube 15 and out into a discharge water header 24; whereas the cooling water flows into the tube 16 from a high pressure water header 25 on the same side of the mold 10b as the low pressure water header 24 in an opposite direction to the cooling water flow in the tube 15 and into a discharge header 26 on the opposite side. The actual location of the high and low pressure headers 23, 24, 25 and 26 is shown in Figure 1 on opposite sides of the mold block 10b adjacent the supporting frame 11; and it will be appreciated that the copper tube 16 is substantially concealed from view by the copper tube 15 in Figure 1 except in the immediate vicinity of the water headers 23, 24, 25 and 26.

It will also be noted that the high pressure cooling water header 25 has a cooling water line (shown diagrammatically in Figure 3) 27 which leads therefrom into the electrical contact or lead 22 at one end of the lining 19. There is a substantial difference in electrical conductivity between the copper lead 22 and the stainless steel skin 19 and, for this reason, it has been found that there is a tendency for very high temperatures to develop in the immediate vicinity of the copper lead 22. The use of massive copper bars to extend across the full width of the end of the skin 19 is not practical in most cases, but the use of relatively short copper bars at leads, such as the lead 22 indicated in Figure 3, results in a very difficult temperature control problem in the immediate vicinity thereof. It has been found possible to control this difficulty by passing cooling water through the tubing 17 and through the body of the lead 22 (electrical insulation ordinarily being provided between the copper tubing 27 and the lead 22 or at least at some point between the lead 22 and the main water header 25). In fact, a copper tubing receiving water from the line 27 passing through the lead 22 may be used as the incoming electric current line 22a. The extremely high heat-conductivity of the copper is effective in cooling the stainless steel sheet 19 immediately adjacent thereto and temperature control in the stainless steel sheet is thus effected primarily by cooling water passing through the lead 22 in the immediate vicinity of the stainless steel sheet 19. A similar arrangement is provided in connection with the other high pressure cooling water header 23 and the opposite electrical lead 21, as indicated by the cooling water line 28 in Figure 3.

As indicated in Figure 3, the lining 19 is in the form of a generally rectangular (at least in plan view) metal sheet bowed in the middle to conform with the cavity contour. The electrical contacts 21 and 22 are connected generally centrally to opposite edges 19b and 19c. The electrical circuit connecting the leads or contacts 21 and 22 is completed by the line 21a connected to the lead 21, a generator 29 has a source of a voltage differential connected to the line 21a and also connected to a variable resistor 30, which in turn is connected to the line 22a that makes contact with the lead 22. Although direct current may be used in the circuit 21, 21a, 29, 30, 22a and 22, it has been found preferable to use alternating current.

In general, the skin 19 is made of substantially uniform cross-sectional thickness or area for a given unit of lateral dimension. For this reason, the general tendency is for the current to flow across the metal skin 19 along the shortest path or paths, which are as shown by the arrows in Figure 3 along the opposite sides 19a' and 19a'' of the bulging portion 19a of the skin 19. In order to avoid localized overheating as a result of the flow of current along the sides 19a' and 19a'' (and to avoid resultant cold spots in other portions of the skin or sheet 19), by-pass means are provided. A by-pass line 31 interconnects a corner 32 of the sheet 19 adjacent the contact 21 with a corner 33 of the sheet 19 adjacent the opposite contact 22. The by-pass line 33 is provided with variable impedance means 34. Although the impedance means 34 may be simply resistance means, it is preferable to employ reactive impedance means (i.e. inductance or capacitance) and most preferably inductance in the particular device. By the use of inductance rather than resistance heat losses or the conversion of electric power to heat at the impedance means 34 is substantially eliminated. The purpose of the by-pass means 31 interconnecting the corners 32 and 33 is to cause current to flow to a limited extent in the general direction of each of the corners so as to avoid localized cooling in these regions and also so as to subtract slightly from the current tending to flow along the path of least resistance (along the side 19a'').

In like manner, current by-pass means 35 interconnect the other two corners 36 and 37 of the sheet 19 and the by-pass means 35 are provided with current control means 38 such as the impedance means 34.

It will thus be seen that once the variable impedance means 34 and 38 have been set so as to effectively equalize the current flow across the entire sheet or skin 19, the current actually fed to the skin 19 is controlled by the impedance means 30, here shown as a variable resistor (but which may also be variable inductance means) and by the use of the variable impedance means 30 it is possible to accurately control the temperature throughout the skin 19 and also to rapidly change the temperature of the skin 19, when such is desired. The cooling coils 15 and 16 are capable of effecting relatively rapid reduction of the skin temperature whenever the current passing therethrough is reduced or cut off, although the coils 15 and 16 serve primarily to maintain a fixed temperature within the resin body 14 during ordinary operation or to maintain a temperature sufficiently low to permit the resin body 14 to retain its strength.

Referring briefly to Figure 1, to show the overall mold structure, it will be noted that the top mold member 10a is the movable member of the mold assembly 10, and the top mold member 10a is movable upwardly (as Figure 1 indicates) in order to separate from the lower mold member 10b by means (not shown). Such movable means are connected to an upper platen or sheet of steel 40 which extends the full width of the upper mold member 10a and is firmly connected to a plurality of guide pin posts 41 and 42 on opposite sides of the mold assembly 10. The guide pin posts mount guide pins 41a and 42a, respectively which are received in guide pin sleeves 43 and 44, respectively, secured to opposite sides of the reinforcing members 12 in order to perfect alignment between the two mold members 10a and 10b. Rigid steel supporting plates 45 and 46 are secured to the guide pin posts 41 and 42, respectively, and extend inwardly to present flange portions 45a and 46a, respectively, which securely mount the resin body 47 of the upper mold member 10a.

The resin body shown generally in Figure 1, but in more complete detail in Figure 2, is formed of cast phenolic or epoxy resin much like the resin matrix 14 (and 14a) and the resin body 47 has embedded therein cooling coils in the form of copper tubes 48 and 49 which are in turn secured to a conductor sheet or copper screen 50 to form a structure comparable to the screen 17 and copper tubes 15 and 16 embedded in the resin matrix 14. The function in each case is also the same, since it is desired to effectively maintain a uniform temperature along the line defined by the screen 50. It will be appreciated, that for the sake of simplicity, the screen members 17 and 50 and the rubber insulator layer 18 have not been shown in Figure 1. The screen 50 and cooling coils 48 and 49 are embedded in the resin matrix 47 and definitely spaced from the cavity 13 by virtue of a resin layer 47a comparable to the resin layer 14a hereinbefore described. The resin layer 47a is also preferably filled with conductor particles, such as aluminum particles so that its conductivity is materially increased above that of the epoxide resin itself. A highly heat-resistant epoxy resin film of material that is substantially rigid at molding tempeartures is provided as a surface 47b for the cavity-defining face of the mold member 10a. This lining 47b may be made of epoxy or epoxy-silicone resin combinations, which are preferably filled with a very substantial amount of heat-resistant particles, such as metal particles so that the lining 47b will be rigid at molding temperatures.

Sufficient heat for effecting the molding operation is provided from the lining or skin 19 and, it will be appreciated, that the laminate 20 is itself an insulator to a substantial extent and this laminate thus also serves to protect the resin components 47, 47a and 47b from thermal degradation. Although epoxy resin or the aluminum-filled epoxy resin layer 47a could be used to provide the surface for the cavity 13, the preferred structure involves the use of a thin more heat-resistant layer 47b which is generally supported by the resin mass 47 (and 47a), but which is very highly filled with metal particles and also may be modified with more highly heat-resistant resins which do not necessarily have the strength that epoxy resins have at high temperatures. In order to maintain adequate temperature control in the upper mold member 10a, however, the coils 48 and 49 are spaced from the lining 47b or the cavity face defined thereby a substantial distance (in substantially the same manner that the coils 15 and 16 are spaced from the lining 19 and the coils 48 and 49 are used as heating coils). These coils are maintained at a temperature of about 50 to 100° F. below the desired molding temperature at the lining 19, and preferably about 75° F. below the maximum desired molding temperature, which is about 160° F. as an average temperature for the coils 48 and 49. By maintaining this temperature in the coils the resin body 47 and 47a (and the lining 47b) are all maintained at substantially a temperature of 160° F. so that cooling of the laminate 20 will not be excessive on the side thereof opposite the lining 19 and a sufficient amount of heat will be imparted to the laminate 20 to effect a substantially complete cure. Using higher distortion point resins, higher operating temperatures throughout the mold assembly may be used along comparable temperature gradients, so as to permit higher molding temperatures.

As in the case of the cooling coils 15 and 16, countercurrent flow is provided between the hot water coils 48 and 49 which also are spaced from each other in substantially the same manner. As indicated in Figure 1, a high pressure hot water header 51 feeds the coil 48 and a low pressure drain line 52 is connected to the opposite side of the tube 48; whereas a high pressure header 53 feeds the coil 49 and a low pressure header 54 receives water from the tube 49.

A typical process involving the use of the mold assembly 10 is as follows:

The first step is that of applying the desired coating to the outer surface of the mold form 10b, as described. A particularly important feature of this process resides in the fact that the outer surface or lining 19 of the mold form 10b is mirror-finished. This is particularly important since it is desired to impart to the ultimately exposed face of the coating a mirror-finished glossy appearance. The lining 19 is usually coated with a small amount of wax or the like mold lubricant prior to the application of the coating composition. The coating composition is then applied to the mold form by means of a spraying unit, or by means of any other suitable coating applying devices or processes. Most preferably, the coating is sprayed upon the lining 19, to apply a uniformly thick coating having approximately 0.001–0.02 inch thickness. The consistency of the coating is preferably such that the coating adheres at the location at which it is sprayed upon the lining 19 and does not run or gather near the base of the lining 19. Since the coating has a tendency to run slightly, the lining 19 is heated by creating a voltage differential across the contacts 21 and 22 (to cause at least a limited amount of preliminary curing to take place in the coating so that the same will adhere at a given location). Also, if a solvent or vehicle is employed to assist in applying the coating to the lining 19, then it is usually desirable to heat the lining 19 in order to drive off the solvent and to leave the coating in the desired thickness hereinbefore mentioned.

Although there are some advantages in the use of clear (unfilled) coating resin as the first application, usually the essential ingredients of the coating thus applied include about one part of pigment-size filler intimately admixed with about two parts of a fluid thermosetting polymerizable unsaturated polyester mixture, which will be described in detail hereinafter. Most preferably, the pigment-size filler is made up of about one part of finely ground amorphous silica filler, or any other inorganic inert finely ground filler which preferably is white or substantially uncolored; and about two parts of titanium dioxide pigment, which has been found to be by far the most superior white pigment (and the use of other white pigments, although inferior in most instances, would not necessarily be contrary to the principles of this invention, for certain special uses). As will be appreciated, it is desired to obtain a mirror-finish high gloss type of coating herein and, accordingly, substantially fine, pigment-size filler materials as well as pigments must be used. Actually, the very substantial amount of titanium dioxide employed permits this ingredient to function both as a filler and as a pigment, and the titanium dioxide may be used in proportions within the range of about 10-30 weight percent of the coating mixture. The finely ground amorphous silica filler is employed principally to incorporate a sufficient amount of filler in the coating composition to impart the desired high viscosity thereto, as well as the necessary superior strength in the finally cured or hardened coating. The amount of such silica filler which may be used may be within the range of about 5-15 weight percent of the coating composition. (As used herein the terms "parts" and "percent" mean parts and percent by weight, unless otherwise specified.)

The remaining ingredient in the coating composition is the polymerizable unsaturated polyester mixture, with the necessary curing or accelerating catalysts incorporated therein. As previously indicated, in the most preferred coating composition about one part of the silica filler, and about two parts of titanium dioxide pigment are admixed with about six to seven parts of the unsaturated polyester mixture. Actually, however, the proportions may be as follows:

| | Percent |
|---|---|
| Titanium dioxide | 10-30 |
| Ground silica filler | 5-15 |
| Polymerizable polyester mixture and the necessary catalyst mixture of ketone peroxide and metal drier | 60-70 |

As will be appreciated, it is often desirable to include in trace amounts certain other tinting agents which assist in giving a richer white color to the coating, such agents including for example iron oxide pigment. Some of the metal driers which are employed in the catalyst also may act as tinting agents as is well within the skill of those familiar with the pigment art.

In connection with the polymerizable polyester mixture, it is known generally the polyester resins may be prepared by esterification-condensation of a polybasic acid (preferably a dicarboxylic acid) and a polyhydroxy alcohol (preferably a dihydric alcohol), in the substantial absence of addition polymerization-inducing conditions. As a typical member of the thermosetting polymerizable polyester which may be cured to form a normally rigid thermoset resin, the polyester resulting from each condensation of maleic acid (or anhydride) with ethylene glycol is mentioned. This polyester is generally referred to in the art as "ethylene glycol maleate," or in the event that a slight amount (i.e. about 10%) of propylene glycol and of phthalic anhydride have also been employed, as is customary in the preparation of laminating resins, the resin is called "ethylene glycol-propylene glycol-phthalate-maleate" and so forth. In general, this polyester is an unsaturated dihydric alcohol-dicarboxylic acid (the unsaturation being furnished by the maleyl radicals therein, which are at least about 60-75 mol percent of the acyl radicals present, the remainder being phthalyl radicals preferably). Often such laminating resins contain a small proportion of a suitably copolymerizable unsaturated monomer such as styrene or diallyl phthalate in order to assist in the cross-linking process during polymerization; but the general characteristics of these "structural" or "laminating" unsaturated polyester resins are those of the true polyester resin system. In other words, the resin is first obtained by the formation of long polyester chain-like molecules which are formed by condensation in the absence of addition polymerization and result in molecular chains having a plurality of unsaturated maleyl radicals therein. When such resins are cured, by addition polymerization, the maleyl radicals form cross-links between the chains thus changing the polymer from "linear" to "three-dimensional" and resulting in a rigid thermoset resin.

It has been found, however, that a flexible, substantially thermoset polyester may also be obtained. In this case the polymerizable polyester is substantially saturated instead of being substantially unsaturated, as just described. Such a resin may be an ethylene glycol-phthalate having perhaps 1-10 mol percent and preferably about 2-5 mol percent of the acid radicals as maleyl radicals and the remainder as phthalyl radicals. The "flexible" and the "structural" (or substantially rigid) polyester resins are both commercially available, and are so designated in industry.

In the instant coating composition, it has already been mentioned that about equal proportions of each such resins may be used. Hereinafter we shall refer to the structural as a "polymerizable unsaturated polyester" which may be thermoset to form a "normally rigid polyester"; and the flexible as a "saturated polyester" which may be cured or set to form a "normally flexible polyester." In admixture, in the coating composition, it has been found that good results are obtained using about 30-50% saturated polyester and about 70-50% unsaturated polyester, and most preferably 40-50% saturated and 60-50% unsaturated polyester.

The catalyst mixture here used is preferably a mixture of peroxide paste, containing equal parts of an organic peroxide and trioresyl phosphate dispersing agent, and a metal drier. The peroxide paste:metal drier ratio is about 3-2:2-1. Most preferably the peroxide employed is a ketone peroxide such as cyclohexanone peroxide which effects a minimum of discoloration during its acceleration of the addition polymerization; and the most active drier preferably used is a cobalt drier, cobalt naphthenate or cobalt maleate. The drier improves the hardness and final cure of the polyester at the air-exposed surfaces thereof. In the instant composition, most preferably about 3% of paste and 2% of the drier is used.

After the thin (i.e. about 0.01-0.02 inch thick) coating has been applied to the mirror-finished lining 19, the next step is that of preparing the glass fiber-resin body. In accordance with the procedure of the preferred method, a plurality (preferably only two) glass fiber mats are cut so as to fold over the coated surface of the mold form 10b and to be substantially coextensive therewith. The glass fiber mats (which are omitted from the drawing for the sake of simplicity, but which will utimately fill the cavity 13 in Figure 2), are thus formed in the shape of a large rectangle with cuts taken out of the four corners. Such glass fiber mats are commercially available in relatively thin form comprising a great plurality of glass fibers or glass fiber strands heterogeneously arranged in the form of a sheet, but sufficiently entangled with each other to form a generally cohesive or unitary sheet, which may be cut and otherwise handled as a sheet of fabric in many respects. Such glass fiber mats may be pre-treated with polyester resin, or they may be placed upon the coated mold form and then have the necessary laminating polyester resin poured thereover so as to completely impregnate the mats. The amount of such laminating resin ordinarily required to accomplish this may range from about 1 to about 3 times the weight of the mat. The polyester laminating resin employed for this purpose is the structural or unsaturated laminating resin hereinbefore described. As previously mentioned, the structural or unsaturated polyester resin is a resin which normally forms a rigid thermoset polyester resin upon addition polymerization thereof. It is known that such polyester when hardened is very rigid and perhaps even slightly brittle, if no filler is present therein. The impregnation of finely ground filler particles, or pigment-size particles, does not subtract substantially from the generally rigid nature of such polyester, so in the case of the instant coating composition we have added the flexible polyester in order to effectively obtain a coating which has the desired degree of resilience or flexibility. It has also been found, however, that if certain fillers, namely, an elongated thin rod-like filler material such as glass fibers of substantial lengths, for example, at least an inch or two and preferably of substantially the entire length of the glass fiber mats, is present in a thermoset normally rigid polyester, a certain limited amount of true resiliency is imparted to the body.

It will be appreciated that the highly pigmented polyester resin initially applied to the stainless steel lining 19 is a viscous liquid composition that flows quite readily down off the lining and, for this reason, it is important to heat the lining 19 by passing an electric current therethrough at the time of the spray application of the highly pigmented resin composition so as to at least partially cure this composition and cause the same to adhere to the surface of the lining 19. As soon as the initial coating has been applied, however, to the extent necessary to cause the same to remain in place on the lining 19, it is desirable to retard polymerization and the instant invention affords the advantage of permitting relatively rapid cooling or temperature decrease in the lining 19 merely by cutting off or cutting back the current passing therethrough. This is then done and the glass fiber mats are applied to the mold form 10b during such cooling. The polyester resin impregnant is then poured onto the top of the glass fiber mats and it is desired to permit substantially complete permeation of the glass fiber body or mat structure with this impregnant, so the temperature of the skin 19 is reduced sufficiently to avoid premature polymerization of the polyester resin during such impregnation of the glass fiber mats. In order to obtain a suitably rapid molding cycle, the polyester resin contains a rather substantial amount of accelerating catalyst and the rate of polymerization is thus controlled by effective temperature control in the mold itself, or in the lining 19 which is the source of heat.

Next, the top mold form 10a is lowered to substantially the position shown in Figure 1 to effectively close the mold assembly 10. It will be noted that the upper mold member 10a carries a peripherally extending baffle member 55 (which extends around the entire periphery of the mold at substantially the parting line or plane P—P between the mold members 10a and 10b). The lower mold member 10b carries a channel 56 facing outwardly and mounting a hose or similar pneumatic member 57 which is expandable against the baffle 55 so as to effectively seal the entire cavity 13 when the mold is in the substantially closed position shown in Figure 1. A vacuum may then be drawn on the cavity 15 so as to purge out air therein and also so as to volatilize a small amount of the monomer in the polyester resin for the purpose of flushing entrapped air out of the cavity 13. A cut-off bar 58 is provided in the parting plane P—P and the cut-off bar 58 is mounted in the upper mold member 10b for cooperation with a sharp edge of the metal skin 19, as at 59, also extending around the entire periphery of the mold 10. The cut-off bar 58 and the sharp edge 59 are spaced apart slightly so that adequate vacuum may be drawn in the entire cavity 13. During this entire operation, it is desirable to maintain the skin temperature at a minimum so as to prevent premature polymerization. The instant apparatus affords the advantage that a relatively rapid temperature drop in the skin 19 may be obtained by the combined effect of cutting off the current passing therethrough and the use of the cooling coils 15 and 16. Complete impregnation of the glass fiber mat with the polyester laminate or impregnant is thus obtained and a slight amount of volatilization of the monomer is also obtained in order to purge air from the system (within the cavity 13). If air purging of the cavity 13 is not employed, it is still desirable to reduce the temperature in the lining 19 so as to permit complete impregnation of the glass fiber mat with the polyester resin impregnant. As soon as complete impregnation of the polyester mat is completed, and air purging of the cavity 13 (if such is desired), complete molding pressure may be applied to the mold 10.

Means for applying the molding pressure (not shown) may be any suitable device, but it is preferred to employ hydraulic or pneumatic means connected to a diaphragm member which urges the top mold member 10a against the bottom mold member 10b. The pressure employed is not particularly high, because the polyester resins are adapted uniquely for use in low pressure laminating. It is, however, important to raise the temperature of the skin to as high a temperature as may be used without scorching the polyester as quickly as possible in order to minimize the amount of time required for retaining the laminate in the mold. The instant invention again affords a unique advantage in that rapid heating of the skin 19 may be accomplished merely by passing maximum current therethrough.

It will thus be appreciated that the instant invention affords unique advantages in temperature control both for rapid cooling and rapid heating. During the initial application of the pigmented coating to the lining 19, any desired temperature may be maintained by imparting the required voltage differential (and an elevated temperature is preferably maintained) and prior to, during or after the application of the polyester impregnated glass fiber mat to the lining 19, the temperature of the lining 19 may also be controlled, so as to permit low temperatures during the initial phases of mold closing and avoid premature polymerization and high temperatures immediately after mold closing so as to speed up the molding cycle.

A typical molding cycle calls for a skin temperature of about 180° to 230° F. during spraying of the pigmented-polyester resin coating (but higher temperatures may be used with higher curing resins such as the melamine formaldehyde resins), a temperature of about 160° to 180° F. during pouring of the resin onto the glass fiber mat and closing (and evacuating) the mold, and a temperature of 240° to 280° F. during the application of molding pressure. During such cycle the heating coils 48 and 49 of the upper mold 10a are maintained at about 160° F. and the cooling coils 15 and 16 are maintained at approximately 100–120° F.; and temperature fluctuations in the skin 19 are effected solely by changes in the current flow therethrough.

It will be understood that modifications and variations may be effected without departing from the scope of the novel concepts of the present invention.

I claim as my invention:

1. A mold of the character described, comprising a rigid heat and electrical insulator body having a die cavity therein, a relatively thin rigid heat and electrical conductor lining fitting within the cavity and supported by the mold body, the exposed face of the lining defining the die cavity surface, said body comprising a heat-resistant insulator film adhering to the back face of said lining and a hardened synthetic resin matrix supporting said film and protected thereby, discrete particles of conductor material embedded in said resin to improve the heat conductivity thereof, a cooling coil embedded in said matrix close to but spaced from said film by a portion of said resin matrix, and electric contacts connected to said lining and arranged to conduct a current therethrough, 2. A mold of the character described, comprising a rigid heat and electrical insulator body having a die cavity therein, a relatively thin rigid heat and electrical conductor lining fitting within the cavity and supported by the mold body, the exposed face of the lining defining the die cavity surface, said body comprising a heat-resistant insulator film adhering to the back face of said lining and a hardened synthetic resin matrix supporting said film and protected thereby, discrete particles of conductor material embedded in said resin to improve the heat conductivity thereof, spaced cooling tubes embedded in said matrix, close to but spaced from said film by a portion of said resin matrix, a conductor sheet engaging said cooling tubes and also embedded in said matrix, and electric contacts connected to said lining and arranged to conduct a current therethrough.

3. A mold of the character described, comprising a rigid heat and electrical insulator body having a die cavity therein, a relatively thin rigid heat and electrical conductor lining fitting within the cavity and supported by the mold body, the exposed face of the lining defining the die cavity surface, said body comprising a heat-resistant insulator film adhering to the back face of said lining and a hardened synthetic resin matrix supporting said film and protected thereby, discrete particles of conductor material embedded in said resin to improve the heat conductivity thereof, spaced cooling tubes embedded in said matrix close to but spaced from said film by a portion of said resin matrix, a conductor sheet engaging said cooling tubes and also embedded in said matrix, electric contacts connected to said lining and arranged to conduct a current therethrough, and current by-pass means contacting spaced portions of said lining to effect substantially uniform current flow through said lining.

References Cited in the file of this patent
UNITED STATES PATENTS

| | | |
|---|---|---|
| 1,237,554 | Price | Aug. 21, 1917 |
| 1,357,343 | Novotny | Nov. 2, 1920 |
| 1,583,643 | Ball | May 4, 1926 |
| 2,085,450 | Rohn | June 29, 1937 |
| 2,194,283 | Kidd | Mar. 19, 1940 |
| 2,296,295 | Shaw | Sept. 22, 1942 |
| 2,317,597 | Ford et al. | Apr. 27, 1943 |
| 2,458,864 | Lindsay | Jan. 11, 1949 |
| 2,701,755 | Strasser | Feb. 8, 1955 |
| 2,710,900 | Linder | June 14, 1955 |